US009194731B2

United States Patent
Chatzikonstantinou

(10) Patent No.: US 9,194,731 B2
(45) Date of Patent: Nov. 24, 2015

(54) CORIOLIS MASS FLOW METER WITH ENHANCED ZERO POINT STABILITY HAVING CROSS BRACES INTEGRALLY FORMED WITH THE HOUSING

(71) Applicant: Rota Yokogawa GmbH & Co. KG, Wehr (DE)

(72) Inventor: Thomas Chatzikonstantinou, Aachen (DE)

(73) Assignee: Rota Yokogawa GmbH & Co. KG, Wehr (DE)

( * ) Notice: Subject to any disclaimer, the term of this patent is extended or adjusted under 35 U.S.C. 154(b) by 99 days.

(21) Appl. No.: 13/902,128

(22) Filed: May 24, 2013

(65) Prior Publication Data
US 2013/0319134 A1 Dec. 5, 2013

(30) Foreign Application Priority Data

Jun. 5, 2012 (DE) .......................... 10 2012 011 158
Aug. 21, 2012 (DE) .......................... 10 2012 016 490

(51) Int. Cl.
*G01F 1/84* (2006.01)
*G01F 15/02* (2006.01)
(52) U.S. Cl.
CPC ............ *G01F 1/8477* (2013.01); *G01F 1/8413* (2013.01); *G01F 15/02* (2013.01)

(58) Field of Classification Search
None
See application file for complete search history.

(56) References Cited

U.S. PATENT DOCUMENTS

| 6,450,042 B1 * | 9/2002 | Lanham et al. .......... 73/861.357 |
| 7,971,494 B2 | 7/2011 | Hussain et al. |
| 2011/0209561 A1 | 9/2011 | Hussain et al. |

FOREIGN PATENT DOCUMENTS

EP 1 985 975 A2 10/2008

\* cited by examiner

*Primary Examiner* — Harshad R Patel
(74) *Attorney, Agent, or Firm* — Collard & Roe, P.C.

(57) ABSTRACT

The invention relates to a Coriolis mass flow meter comprising two U-shaped measuring tubes having in each case two outer tube portions and an intermediate central tube portion. It comprises a vibration exciter for the purpose of effecting defined excitation of a movement of the measuring tubes, two vibration sensors for detecting movements of the measuring tubes and also a housing for accommodating at least parts of the measuring tubes. The inlets and outlets are rigidly connected to the housing. A first and a second cross brace, disposed in the region of the tube between its inlets and outlets for the purpose of coupling the two measuring tubes, form the vibration nodes of the measuring tubes. A tube portion of one measuring tube is integrally united with a tube portion of the other measuring tube. Furthermore, the two tube portions are integrally united with parts of the housing or integrally united with of one of the cross braces.

5 Claims, 3 Drawing Sheets

CORIOLIS MASS FLOW METER WITH ENHANCED ZERO POINT STABILITY HAVING CROSS BRACES INTEGRALLY FORMED WITH THE HOUSING

CROSS REFERENCE TO RELATED APPLICATIONS

Applicant claims priority under 35 U.S.C. §119 of German Application No. 10 2012 011 158.4 filed on Jun. 5, 2012 and German Application No. 10 2012 016 490.4 filed on Aug. 21, 2012, the disclosures of which are incorporated by reference.

BACKGROUND OF THE INVENTION

1. Field of the Invention

The invention relates to a Coriolis mass flow meter.

2. The Prior Art

Such a Coriolis mass flow meter is disclosed in EP 1 985 975 A2. This comprises two U-shaped measuring tubes, through which the fluid to be measured flows. A vibrator causes the measuring tubes to vibrate in a defined manner. By means of two vibration sensors the movements of the two measuring tubes at different points is ascertained. The mass flow is calculated from the phase shift of the vibrations measured by the two vibration sensors.

The currently used mass flow meters are also used for low-density fluids, for example gases, or for fluids exhibiting a very high viscosity, the mass flow prevailing with both types of fluid mentioned being usually very low. For this reason, the phase shift between the two vibration sensors is generally very small. Thus, in order to make it possible to measure small mass flows very accurately, the zero point stability of the mass flow meter must be high. To achieve this high zero point stability, it is necessary, inter alia, for the mass flow meters to show minimum vibration in the region of the joint, such that virtually no vibrational energy is dissipated into the adjoining process line. If the forces that are produced by the vibrating measuring tubes are not completely compensated for, the entire housing accommodating the measuring set-up can be caused to vibrate. Thus the vibrational energy can be passed on to the adjoining process line, which in turn leads to feedbacks. Such feedbacks can adulterate the readings. This negative effect may be enhanced when the vibration initiated by the measuring set-up resonates with vibrations in adjacent hydraulic and pneumatic installations. In this case, very strong interaction between the device and the environment may occur, which can in turn lead to considerable measuring errors.

In order to increase the zero point stability in conventional Coriolis mass flow meters, it is known to attach cross braces between the individual measuring tubes. These cross braces then interconnect the U-shaped measuring tubes at their outer tube portions such that the relative position of the measuring tubes is kept constant at least in these outer tube portions. They have the task of separating the natural self-excited vibration of the measuring tubes, such as occurs in the case of non-flowing fluid, from vibration caused by Coriolis forces in the case of flowing fluid, and to reduce the transference of oscillations between the measuring tubes and the piping system. The aforementioned EP 1 985 975 A2 is concerned with the question as to how such cross braces should be precisely arranged in order to damp the vibration as far as possible. The cross braces are attached to each other by conventional connecting methods, such as by adhesion, by welding, or by the use of pin-and-socket connectors. All of these connecting methods are, however, subject to very high manufacturing tolerances. As a result, each joint is to a certain extent a unique entity, which in turn has an individual transmission characteristic in terms of the vibration produced. In this respect, certain vibrational frequencies are readily propagated through the joints of some measuring devices, while in the joints of other measuring devices these vibrational frequencies are damped to a greater extent.

It has been found that in spite of the already proposed solutions regarding the zero point stability there is still room for further improvement.

SUMMARY OF THE INVENTION

It is now an object of the present invention to provide an improved Coriolis mass flow meter that exhibits an enhanced zero point stability. This object is achieved by a Coriolis mass flow meter as defined in accordance with the invention. Advantageous embodiments of the invention are discussed below.

The basic concept of the invention lies, more particularly, in the feature that individual core elements of the Coriolis mass flow meter are integrally united with each other. This specifically applies at least to individual tube portions of adjacent measuring tubes. This means that a portion of one of the measuring tubes forms a single unit with a tube portion of the other measuring tube. The joint between these measuring tubes can then be formed via the housing or a portion of the housing, which is in turn integrally united with these two tube portions and/or with a cross brace, which is in turn formed as a single unit with these two tube portions.

The integral design of the aforementioned parts of the measuring device can produce very stable units from these elements. Furthermore, the transition regions between the individual elements can be provided with defined transmission characteristics. This allocation of transmission characteristics can be reliably carried out in practice and is not subject to any kind of significant quality fluctuations in production, as is inevitably the case with the connecting methods used hitherto, such as, for example, joining by adhesive, joining by welding, or joining using plug-and-socket connections.

It is particularly advantageous when a cross brace is formed with two adjacent outer tube portions of two separate measuring tubes and this cross brace further integrally adjoins a wall portion of the housing. In this way it is possible to create a very reliable and more particularly very rigid joint between the outer tube portions and the housing in a very simple manner, moreover at a site located within the measuring tube at a distance from the actual joint between the measuring tubes and the process line.

In a very preferred embodiment, an integrally designed pipe connector housing is provided that comprises the following components: two outer tube portions that are more particularly adjacent to each other and are assigned to the two separate measuring tubes; a housing portion for the accommodation of the two tube portions; a connecting piece on the housing, by means of which the process line is joined to the measuring tubes; and a cross brace adapted to connect the two outer tube portions directly to the housing. This means that the cross brace is formed integrally with the two outer tube portions and with the housing portion.

Such a design of a pipe connector housing forms a solid and rigid unit, which is capable, as a unit, of withstanding and, if desired, absorbing vibration occurring in adjacent regions. Thus, vibration occurring either at the inlets or at the central portion of the tube in the direction of the pipe connector housing, are no longer positively absorbed only by the outer tube portions and further transported to the region of the join, but can in advance be transferred directly to the actual housing. It is obvious, that such a pipe connector housing can be provided both in the inlet region and in the outlet region.

It is basically possible for separate central tube portions to adjoin outer tube portions. However, in a preferred embodiment, provision is made for the tube portions of the measuring tubes to be integrally united so as to extend from the inlet to the outlet as a single piece.

According to the invention, the production of the Coriolis mass flow meter of the aforementioned type is carried out in a method step involving molding of the tube portions of the two measuring tubes and portions of the housing or the cross braces, during which method step the tube portions and portions of the housing and/or the cross braces are formed by layers of liquid or liquefied material. Suitable methods for this purpose include the well known rapid-prototyping method, and more particularly the 3D printing method or stereolithography. The cost of these methods has dropped considerably in recent years, such that in view of the very simply achieved quality enhancement the use thereof for the production of such measuring devices may now be regarded as being particularly suitable.

BRIEF DESCRIPTION OF THE DRAWINGS

The invention is explained in greater detail below with reference to the figures in an exemplary and non-restrictive manner, in which.

DETAILED DESCRIPTION OF PREFERRED EMBODIMENTS

Figure 1A:
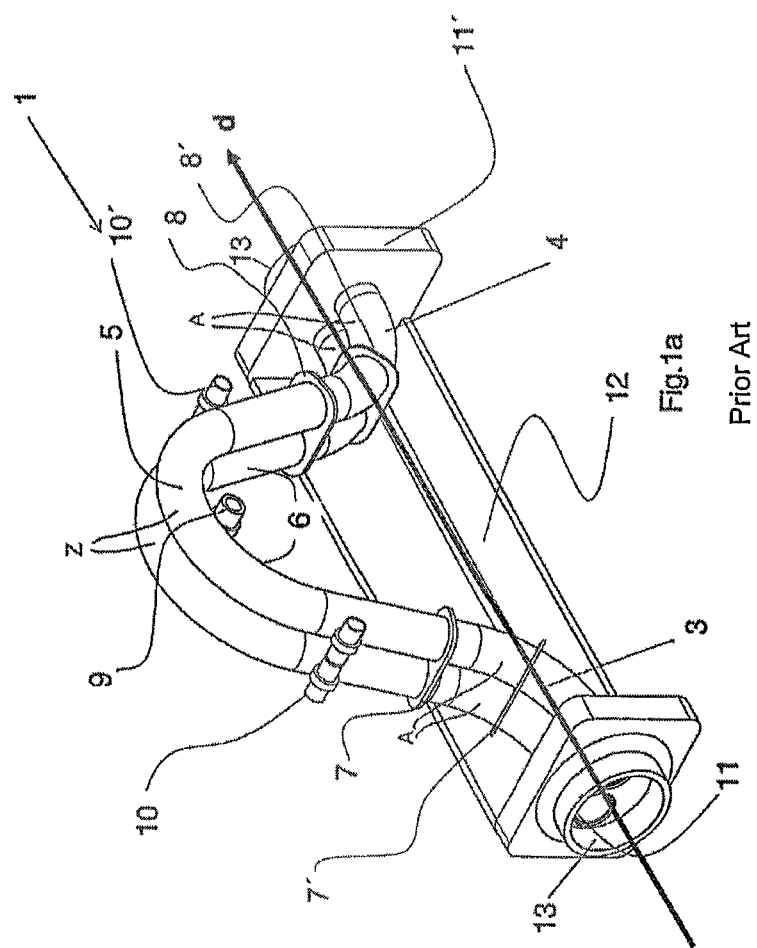
FIG. 1a is a diagrammatic perspective view of a Coriolis mass flow meter of the prior art.
Figure 1B:
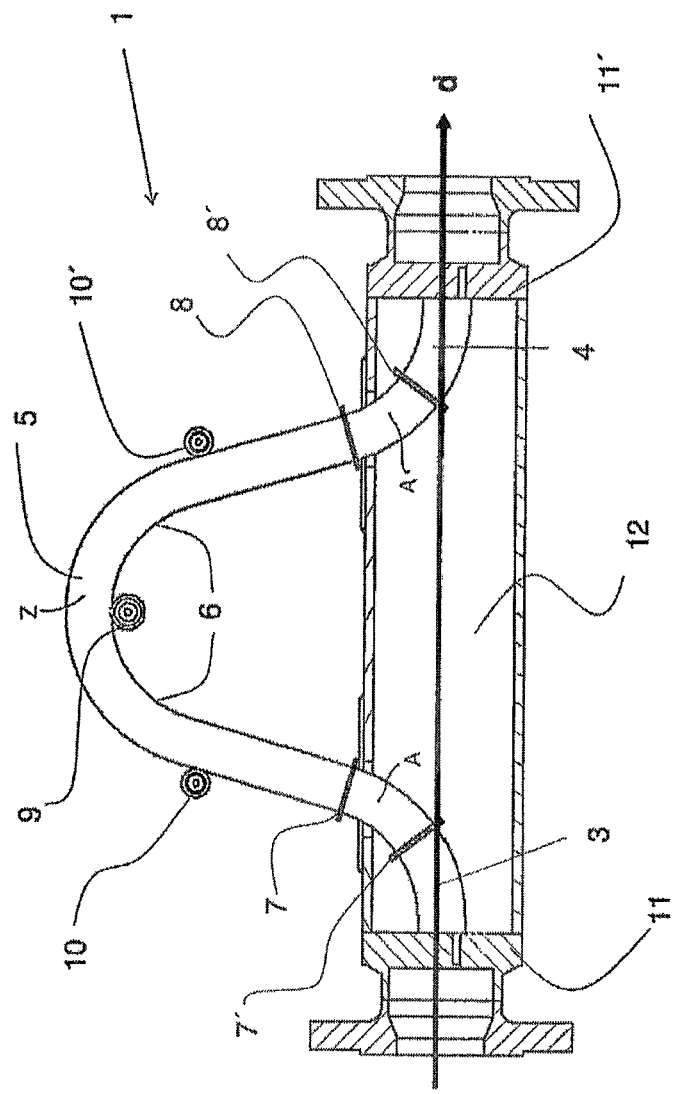
FIG. 1b is a side view of the Coriolis mass flow meter illustrated in FIG. 1.

FIGS. 1a and 1b show a Coriolis mass flow meter 1 of the prior art. The illustration according to FIG. 1a is a perspective view, the illustration according to FIG. 1b is a diagrammatic side view. The Coriolis mass flow meter 1 comprises a housing in the form of a metallic frame 12, at the ends of which there are located an inlet 3 and an outlet 4 for a fluid. In the vicinity of the inlet 3 and the outlet 4 there are located process connectors 13 for the purpose of incorporating the meter 1 in a process line. Between the inlet 3 and the outlet 4 there is disposed a pair of U-shaped measuring tubes 5 that are in each case adapted to allow a fluid medium to flow therethrough. To ensure that both measuring tubes 5 will transport fluid, a stream-splitting device 11 is provided in the present case in the vicinity of each of the inlet 3 and the outlet 4. The two measuring tubes 5 exhibit in each case two outer tube portions A, between which a central tube portion Z is disposed. The outer tube portions A have outward curves, while the central tube portion Z has a central curve running in a direction opposed to the outward curves. The outer tube portions A are provided, in this example, in each case with two cross braces 7, 7' and 8, 8', which fix the relative position of the two measuring tubes, at least in the region of the outer tube portion A. The direction of flow of the fluid is designated by the arrow d.

The two measuring tubes 5 are caused to oscillate in opposite directions by means of a vibration exciter 9. The two U-shaped measuring tubes then move periodically away from each other and back towards each other. The oscillatory movements of the measuring tubes 5 are then detected by the two vibration sensors 10 and 10'. If no fluid flows through the Coriolis mass flow meter 1, the movements of the measuring tubes 5 detected by the two vibration sensors 10 and 10' respectively are in phase with each other. When, on the other hand, a fluid medium is flowing through the measuring tubes 5, the medium flowing therethrough will then experience, on account of the oscillatory movement of the measuring tubes 5, a Coriolis force that is differently vectored in the region of the respective vibration sensors 10 and 10' respectively. For this reason, a phase shift occurs between the signals detected by means of the vibration sensor 10 and 10' respectively. The measured phase angle is directly proportional to the mass flow. The modulus of elasticity of the measuring tube material is temperature-dependent and is likewise included in the proportionality constant between phase angle and mass flow. For this reason, the temperature of the measuring tubes 5 is measured and the phase angle adapted accordingly. With the aid of suitable signal processing techniques, a usable signal is formed from the measured signals, and this provides information on the desired mass flow.

Figure 2:
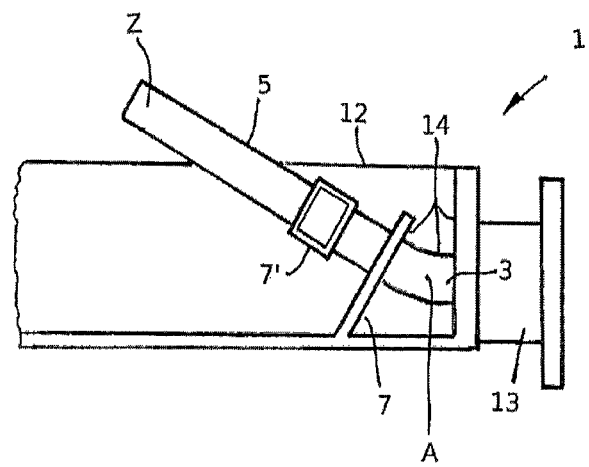
FIG. 2 is a diagrammatic side view of a portion of the Coriolis mass flow meter of the invention.
Figure 3:
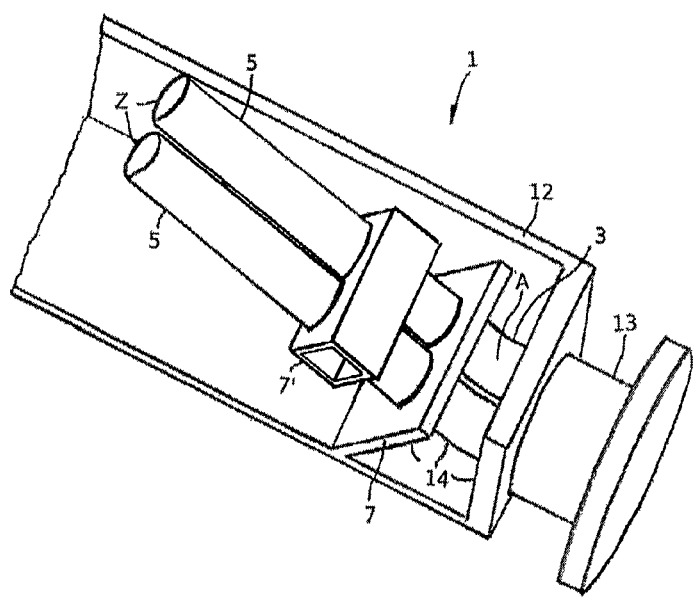
FIG. 3 is a diagrammatic perspective view of the portion illustrated in FIG. 2.

The basic structure of this prior mass flow meter also applies, unless otherwise stated, to the mass flow meter 1 of the invention, which will now be explained with reference to FIGS. 2 and 3. In said figures there is shown, for the sake of clarity, only that half of the measuring device 1 that comprises the inlet 3. The other half, which comprises the outlet 4, is identically designed. Further, the sensors present and the vibration exciter are not included in the illustration. One side wall of the housing is not shown.

It may be seen that the essential elements of the mass flow meter 1 are integrally united with each other, with the exception of the sensors and the vibration exciter. Thus the housing 12 and the measuring tubes 5 are formed as one single piece. In the region of the inlet 3 and the outlet 4 there is an integral joint between the housing 12 and the measuring tubes 5 in the region of a connecting piece 13, by means of which the measuring tubes 5 can be connected to a process line (not shown). An integral joint between the measuring tubes 5 and the housing 12 is further provided by a first cross brace 7, which extends substantially at right angles to the direction of flow and forms a right angle with a side wall of the housing 12. It forms a first vibration node of the measuring tubes 5. A second cross brace 7' situated at a distance from the first cross brace forms a second vibration node of the measuring tubes 5. The second cross brace 7' is in the form of a tube and in the illustrated exemplary embodiment, it is in the form of a square tube. It is oriented away from the inlet, i.e. from the connecting piece 13, and, as viewed from the outer tube portions A, faces the central tube portion Z, but unlike the first cross brace 7, it does not extend to the housing wall 12, but terminates previously. In this respect the second cross brace 7' and the housing wall 12 are not directly interconnected. Thus is it possible for regions of the measuring tubes 5 that are located further away in the direction of the central tube portion Z to move at an increased distance relatively to the housing 12. The motion of the two measuring tubes 5 is coupled in this region to the second cross brace 7'.

It will be seen that a pipe connector housing 14 is formed in the region of the inlet 3 and also in the region of the outlet (not shown), which pipe connector housing is formed by the housing wall 12 in the region of the inlet or the outlet, and by the outer tube portions A and also by the first cross brace 7. Irrespective of the fact that the other elements are also integrally united with each other, this integrally formed housing of the tube portion 14 alone provides a very solid and stable unit, which makes it possible for the process connectors 13 to be substantially totally decoupled from vibration in the central tube portion Z. The transitions between the individual elements of the pipe connector housing can always be reproduced in uniform quality, such that a given vibration transfer behavior can be predefined.

The design of the cross braces 7, 7' applies equally to the cross braces not shown.

Suitable methods for the production of such measuring devices include a molding method, more particularly a rapid prototyping method, such as stereolithography or the 3D printing method, which methods the integrally united elements of the measuring device are formed by layers of liquid or liquefied material.

What is claimed is:

1. A Coriolis mass flow meter, comprising first and second U-shaped measuring tubes comprising in each case two outer tube portions and an intermediate central tube portion, wherein the first and second U-shaped measuring tubes are capable of allowing a fluid to flow therethrough, wherein said first and second U-shaped measuring tubes in each case comprise an inlet and an outlet;
   a vibration exciter for defined excitation of a movement of said first and second U-shaped measuring tubes;
   two vibration sensors for detecting movements of said first and second U-shaped measuring tubes;
   a housing for accommodating at least parts of said first and second U-shaped measuring tubes, wherein more particularly said inlets and said outlets are rigidly connected to said housing;
   a first and a second cross brace for coupling the first and second U-shaped measuring tubes in a region between said inlets and outlets;
   wherein a first outer tube portion of the two outer tube portions of said first U-shaped measuring tube is integrally united with a first outer tube portion of the two outer tube portions of said second U-shaped measuring tube,
   wherein the first outer tube portion of the first U-shaped measuring tube and the first outer tube portion of the second U-shaped measuring tube are further integrally united with parts of the housing,
   wherein the first cross brace is integrally united with the first outer tube portion of said first U-shaped measuring tube and with the first outer tube portion of said second U-shaped measuring tube,
   wherein the first outer tube portion of said first U-shaped measuring tube is adjacent to the first outer tube portion of said second U-shaped measuring tube, and
   wherein the first cross brace forms a single-piece structure adjoining a wall portion of said housing.

2. The Coriolis mass flow meter as defined in claim 1, wherein said first and second U-shaped measuring tubes are also each in the form of a respective single piece extending from said inlet to said outlet.

3. The Coriolis mass flow meter as defined in claim 1, where the second cross brace is in the form of a square tube.

4. The Coriolis mass flow meter as defined in claim 1, further comprising an integrally united pipe connector housing formed via:
   said first outer tube portion of said first U-shaped measuring tube and said first outer tube portion of said second U-shaped measuring tube,
   a housing portion of said housing for the accommodation of said two first outer tube portions,
   a connecting piece for the purpose of joining said first and second U-shaped measuring tubes to a process line; and
   said first and second braces, which connect the two first outer tube portions directly to said housing portion.

5. A method for the production of a Coriolis mass flow meter as defined in claim 1, wherein said two first outer tube portions and portions of said housing and/or said first and second cross braces are fabricated in a method step involving a molding process, in which method step said two first outer tube portions and portions of said housing and/or said cross braces are formed by layers of liquid or liquefied material.

* * * * *